US011270267B2

(12) United States Patent
Mohler et al.

(10) Patent No.: US 11,270,267 B2
(45) Date of Patent: Mar. 8, 2022

(54) SENSITIVE INFORMATION MANAGEMENT (75) Inventors: David S. Mohler, Arvada, CO (US); Jason H. Vick, Pine, CO (US)

(73) Assignee: Avaya Inc., Basking Ridge, NJ (US)

( * ) Notice: Subject to any disclaimer, the term of this patent is extended or adjusted under 35 U.S.C. 154(b) by 1925 days.

(21) Appl. No.: 11/955,170

(22) Filed: Dec. 12, 2007

(65) Prior Publication Data

US 2009/0158441 A1     Jun. 18, 2009

(51) Int. Cl.
*G06F 21/62* (2013.01)
*G06F 21/55* (2013.01)
*G06F 21/86* (2013.01)
*G06Q 10/10* (2012.01)

(52) U.S. Cl.
CPC ......... *G06Q 10/109* (2013.01); *G06F 21/552* (2013.01); *G06F 21/6209* (2013.01); *G06F 21/86* (2013.01); *G06F 2221/2137* (2013.01); *G06F 2221/2143* (2013.01); *G06F 2221/2151* (2013.01)

(58) Field of Classification Search
CPC .... G06F 21/10; G06F 21/552; G06F 21/6209; G06F 21/86; G06F 2221/2143; G06F 2221/2151; G06F 2221/2137; G11B 20/00086; G06Q 10/109
USPC .............................. 726/26–30; 713/193, 189
See application file for complete search history.

(56) References Cited

U.S. PATENT DOCUMENTS

| | | | |
|---|---|---|---|
| 7,634,543 B1* | 12/2009 | Van Zant et al. | 709/206 |
| 7,693,877 B1* | 4/2010 | Zasman | H04L 67/1097 707/662 |
| 7,861,299 B1* | 12/2010 | Tidwell et al. | 726/22 |
| 2002/0064149 A1* | 5/2002 | Elliott et al. | 370/352 |
| 2003/0130857 A1* | 7/2003 | Matsuo | 705/1 |
| 2004/0025053 A1* | 2/2004 | Hayward | 713/201 |
| 2004/0263315 A1* | 12/2004 | Kim et al. | 340/5.7 |

(Continued)

FOREIGN PATENT DOCUMENTS

| | | |
|---|---|---|
| WO | WO 97/25798 | 7/1997 |
| WO | WO 98/58321 | 12/1998 |

OTHER PUBLICATIONS

Extended Search Report for European Patent Application No. 08017956.7, dated Jun. 19, 2012 7 pages.

(Continued)

*Primary Examiner* — Farid Homayounmehr
*Assistant Examiner* — Suman Debnath
(74) *Attorney, Agent, or Firm* — Sheridan Ross P.C.

(57) ABSTRACT

Information is identified as sensitive and a lapsed time job (Chron Job) is created that will allow the deletion of sensitive information after a period of time. The interval could be set to be longer than vacation or other planned use, and yet short enough to limit the period where risk to the organization or individual is incurred. The Chron Job could be integrated with the user's calendar, such that the Chron Job considers holiday time as a means of delaying execution of the Chron Job which would allow a shorter interval to be selected. In addition to deletion of the information identified as sensitive, additional steps could also be taken, such as the purging of the recycle bin, modification of the FAT, and optionally the deletion of related information. Once information is identified as sensitive, the information and derivative works are tracked and managed.

5 Claims, 4 Drawing Sheets

(56) References Cited

U.S. PATENT DOCUMENTS

| | | | | |
|---|---|---|---|---|
| 2006/0095285 | A1* | 5/2006 | Sol et al. ........................ | 705/1 |
| 2006/0253445 | A1* | 11/2006 | Huang ................. | G06F 21/554 |
| 2006/0265446 | A1* | 11/2006 | Elgressy ............... | G06F 21/445 |
| | | | | 709/200 |
| 2007/0033283 | A1* | 2/2007 | Brown ................... | H04L 51/12 |
| | | | | 709/226 |
| 2007/0113101 | A1* | 5/2007 | LeVasseur ........... | G06Q 10/107 |
| | | | | 713/189 |
| 2007/0192604 | A1* | 8/2007 | Chiasson et al. ............ | 713/170 |
| 2008/0064501 | A1* | 3/2008 | Patel ............... | 463/40 |
| 2008/0104021 | A1* | 5/2008 | Cai et al. ........................ | 707/3 |
| 2008/0301770 | A1* | 12/2008 | Kinder ................ | H04L 63/0823 |
| | | | | 726/2 |
| 2009/0083544 | A1* | 3/2009 | Scholnick et al. ........... | 713/186 |

OTHER PUBLICATIONS

Official Action for European Patent Application No. 08017956.7, dated Feb. 17, 2014 2 pages.

Intention to Grant for European Patent Application No. 08017956.7, dated Jul. 17, 2015 41 pages.

\* cited by examiner

SENSITIVE INFORMATION MANAGEMENT

FIELD

Exemplary embodiments of the present invention relate to information management. More specifically, an exemplary embodiment is directed toward management of sensitive information, including deletion of sensitive information upon detection of a triggering event.

BACKGROUND

The proliferation of electronic devices has had corresponding increase in the amount of sensitive information that is stored on these devices. Devices such as cell phones, PDA's, laptops, smart devices, and the like, include memories and such functionality as "auto complete" that are capable of storing information that may be sensitive—this sensitive information can include passwords, account information, SSN's, credit card information, proprietary company information, etc.

Laptop computers are also becoming smaller and lighter with ever increasing storage capacities. It is possible to store tremendous amounts of information on today's laptops, with some of that information being potentially sensitive or confidential.

SUMMARY

While convenience and work portability are greatly increased with the ability to store and transport information, there is an increased exposure and potential liability if this information is misplaced, lost, stolen or accessed in an unauthorized manner.

Furthermore, identity theft is currently affecting about 1 in 15 people, and corporate espionage is becoming more commonly used to gain an unlawful competitive advantage.

Exemplary aspects of the invention are, in general, operating system and application agnostic, can apply to enterprise, corporate, personal or other information that is identified as sensitive, and allows the management of such information to assist with the dissemination, accessibility and lifecycle of the information.

In a normal enterprise or other large user environment, an organization typically has the need to place or download sensitive financial, planning, personal information, or the like, on a variety of computing devices. This information could be in databases, spreadsheets, presentations, email, in a file, associated with an application, in a device, such as a smart device, or other electronic form. Numerous recent news headlines have highlighted the embarrassment of large organizations when this personal or sensitive information has found its way into the wrong hands. Unfortunately, the reality is that normal day-to-day business requires associates to manage personal or other sensitive information as part of daily workflow. However, the loss of a single computing device creates risk for the organization, such as identity theft, loss of strategic advantage, disclosure of sensitive information, and the like. One exemplary embodiment of this invention seeks to at least partly mitigate this problem via a simple method of file identification and deletion.

In accordance with an exemplary embodiment, information is identified as sensitive and a lapsed time job (Chron Job) is created that will allow the deletion of sensitive information after a period of time. The interval to initiate a Chron Job could be set to be longer than vacation or other planned use, and yet short enough to limit the period where risk to the organization or individual is incurred. The Chron Job could be integrated with the user's calendar, such that the Chron Job considers holiday or vacation time as a means of delaying execution of the Chron Job which would allow a shorter interval to be selected. In addition to deletion of the information identified as sensitive, additional steps could also be taken, such as the purging of the recycle bin, modification of the file allocation table, and possibly the deletion of related information. Once information is identified as sensitive, the information could be partitioned into folders, directories or the like, then entered into the Chron Job for automatic deletion.

Furthermore, Chron Jobs could be accelerated by activities that appear to be bogus login or access attempts. A variety of detection means for unauthorized access attempts could be used such as two or more incorrect login attempts, or the like. If the computing equipment were equipped with wireless communication means, execution of the Chron Job or acceleration of the same due to perceived unauthorized login or tampering could communicate the device's location to the enterprise or organization. These basic concepts can be extended to any smart device or in general, any device that is capable of storing sensitive information such as a flashcard, USB drive, PDA, cell phone, set-type box, personal computer, or the like. The combination of these methods can advantageously partially mitigate the risks associated with loss or theft of sensitive information or the device containing the sensitive information.

The net value to an enterprise or other large organization could be very large when one considers the liabilities associated with loss of personal, strategic planning, or financial information. The invention may further mitigate litigation risks when a company or organization takes proactive steps to safeguard such information.

Other exemplary aspects of the invention relate to a graphical user interface that could be triggered to be displayed upon the identification of information as sensitive. Once information is identified as sensitive, related information, such as files derived from the information identified as sensitive, emails that are generated as a result of forwarding or replying to an original email with sensitive information, or the like, could trigger an alert to the user that the information is sensitive, and/or could provide the user with the ability to modify the Chron Job associated with that sensitive information.

Still another exemplary aspect of the invention relates to the utilization of signatures, such as LAN or WAN information, MAC addresses, hardware signatures, such as BIOS identifiers, PC hardware and/or software configurations, memorized passwords, external access profiles, and the like, to assist with identifying when the sensitive information may be outside its normal (or authorized) operating environment. If it is determined that the sensitive information is outside its authorized environment, a tamper flag can be generated, and management of the sensitive information to include, deletion, sanitizing, overriding, or additional access restrictions put in place.

Still further exemplary aspects of the invention relate to a smart calendaring function that is capable of interfacing with a calendar, such as an electronic calendar, and delaying the deletion or other handling of sensitive information based on, for example, a vacation scheduled by the user, holidays, travel plans, or the like.

Thus, an exemplary aspect of the invention is directed toward information management.

Further aspects of the invention relate to sensitive information management, wherein the management at least includes one or more of deletion, sanitizing, restricted access, identification, unauthorized access detection, and the like.

Additional aspects of the invention relate to intelligence that analyzes sensitive information and determines an appropriate action to take based on the sensitive information.

Still further aspects of the invention relate to assigning a degree of sensitivity to sensitive information.

Still further aspects of the invention relate to utilizing the assigned degree of sensitivity to prioritize actions upon a triggering event, such as tamper detection.

Still further aspects of the invention relate to the management of sensitive information in one or more of a file, folder, email, data field, application, database, operating system, smart device, directory, or the like. The sensitive information can be, for example, personal, enterprise level, corporate, or in general any information identified as sensitive such as a bank account number, social security number, or the like.

Aspects of the invention also relate to the tracking of sensitive information through various types of media and/or into other formats and determining if an associated document, format, email, or the like, should also be identified as sensitive.

Another exemplary aspect of the invention relates to restricting access to information identified as sensitive by preventing boot of a device, blanking the screen of a device, disabling an input device, such as a keyboard, halting an application, obfuscating sensitive information, restricting distribution, preventing access to a device, requesting supplemental authentication, altering a boot sequence, modifying an operating system or profile, disabling a device, or the like.

Still further aspects of the invention relate to associating a sensitive information identifier with information identified as sensitive. This sensitive information identifier can be stored in one or more of the header of a file, a file allocation table, watermark, associated with an email, data field, database, or the like, or in general associated with any electronic information identified as sensitive.

Still further aspects of the invention relate to providing a user interface that allows the management, including creation, deletion and editing, of a sensitive information identifier associated with sensitive information.

These and other features and advantages will be apparent from the disclosure herein. The described embodiments and configurations are neither complete nor exhaustive. As will be appreciated, other embodiments of the invention are possible utilizing, alone or in combination, one or more features as set forth above, or described in detail below.

BRIEF DESCRIPTION OF THE DRAWINGS

Exemplary embodiments of the invention will be described in detail, with reference to the following figures, wherein.

DETAILED DESCRIPTION

The exemplary embodiments of this invention will be described in relation to information management. However, it should be appreciated that in general, the systems, methods and techniques of this invention will work well for various types in information in various formats in any electronic environment.

The exemplary systems, methods and techniques of this invention will be described in relation to information management systems, and associated computing and storage hardware, software and/or communication channels. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details as set forth herein.

Furthermore, while the exemplary embodiments illustrated herein show various components of the system collocated, it is to be appreciated that the various components of the system can be located at distant portions of a distributed network, such as a communications network and/or the Internet, or within a dedicated secure, unsecured, and/or encrypted system. Thus, it should be appreciated that the components of the system can be combined into one or more devices, such as a computer, smart device, storage device, or the like, or collocated on a particular node of a distributed network, such as an analog and/or digital communications network, a circuit-switched network and/or a packet-switched network. As will be appreciated from the following description and for reasons of computational efficiency, the components of the system can be arranged at any location within a distributed network without affecting the operation of the system. For example, the various components can be distributed in a client-server type architecture, at one or more users' devices, in a dedicated information management module, or some combination thereof.

Similarly, one or more functional portions of the system could be distributed between a storage device(s) and an associated computing device.

It should also be appreciated that various links, including any communications channels and the various links 5, connecting the elements, can be wired or wireless links, or any combination thereof, or any other well-known or later developed element(s) that is capable of supplying and/or communicating data to and from the connected elements. The term module as used herein can refer to any known or later developed hardware, software, firmware, fuzzy logic, expert system, neural network or combination thereof that is capable of performing the functionality associated with that element. The terms determined, calculate and compute and variations thereof, as used herein are interchangeable and include any type of methodology, process, mathematical operation or technique. Furthermore, it is to be noted that the term "a" or "an" entity refers to one or more of that entity. As such, the terms "a" or "an", "one or more" and "at least one" can be used interchangeably herein. It is also to be noted that the terms "comprising", "including" and "having" can be used interchangeably.

Also, while the flowcharts have been discussed and illustrated in relation to a particular sequence of events, it should be appreciated that changes, additions, and omissions to this sequence can occur without materially affecting the operation of the invention.

Figure 1:
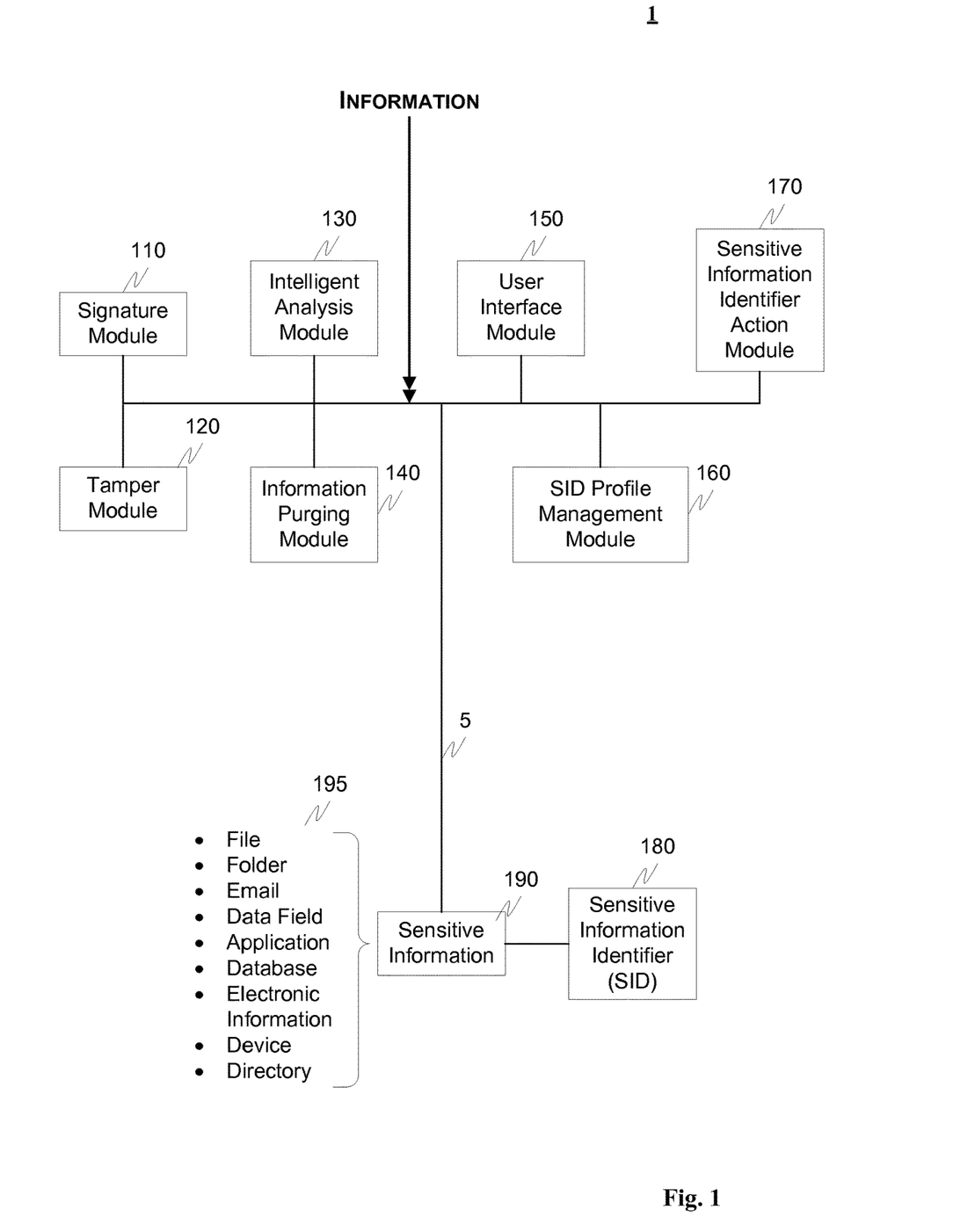
FIG. 1 illustrates an exemplary information management system.

As will be appreciated, the information management system 1 can also comprise other well known components which will not be described herein in detail. For example, the information management system 1 can further include one or more processors, memory, communications devices, or the like that can be of any architecture for assisting with information management.

FIG. 1 illustrates an exemplary information management system 1. The information management system 1 comprises a signature module 110, a tamper module 120, an intelligent analysis module 130, an information purging module 140, a user interface module 150, a SID (Sensitive Information Identifier) profile management module 160, a SID action module 170, a SID 180, and sensitive information 190. The sensitive information 190 can at least be one or more of a file, folder, email, data field, application, database, memorized password, external access information, electric information, device, directory, or the like, 195.

In operation, information is received by the information management system 1. For example, the information management system 1 can monitor communications within a particular environment, such as a personal computer, enterprise, company, or the like, and analyze the information to determine whether the information should be (or has been) identified as sensitive. More specifically, and in cooperation with the intelligent analysis module 130 and SID profile management module 160, certain patterns or profiles can be utilized to allow the information management system 1, and in particular, the intelligent analysis module 130, to determine if information is sensitive.

For example, the pattern or profile can specify that if information is:
1. a field is identified by a sensitive field name (e.g., SSN),
2. a SID is associated with the information,
3. a communication is marked as sensitive,
4. a communication is related to sensitive information (e.g., keywords),
5. a document is created by a certain user or group of users,
6. a document includes a password,
7. a sender or recipient address is in a predetermined list, and/or
8. the information is associated with a category of person(s) within an organization, or the like, the intelligent analysis module 130 can assign a SID 180 to the sensitive information 190. This SID 180 is then associated with the sensitive information 190.

The SID profile management module 160 can be preprogrammed to include information to assist the intelligent analysis module 130 with the identification of sensitive information. For example, field names, (such as SSN, account number, or the like), document creation information, sender or recipient information, or in general, any information that assists the intelligent analysis module 130 to identify sensitive information can be used as a template for sensitive information identification in the SID profile management module 160.

The information that can be added into the SID profile management module 160 may also be templates that, for example, are user or enterprise specific, data specific, or the like, and can also be used with an expert system that is capable of tracking and performing an analysis across, for example, a plurality of documents that may not be received by the intelligent analysis module 130 coincident in time. These templates allow the information management system 1 to appropriately identify, subsequently manage and track sensitive information.

Once information is identified as sensitive, a sensitive information identifier 180 is appended or otherwise associated with the sensitive information. For example, the sensitive information identifier can be placed in a header of a file or email, it can be a separate tag or file associated with the sensitive information, it could apply to a portion of or the entirety of the electronic information identified as sensitive information, it can be a flag, or, in general, any indicator that allows the intelligent analysis module 130 to track sensitive information 190 within any electronic environment.

Furthermore, the sensitive information identifier 180 could be portable such that if, for example, a file was transferred from a hard drive to a USB storage device, the sensitive information identifier "follows" the sensitive information. As is well known in the computer industry, various techniques can also be used to encrypt, obfuscate, or otherwise hide the sensitive information identifier such that tampering with or attempting to delete the sensitive information identifier is made more difficult.

In accordance with an exemplary embodiment, the information management system 1 is an application that resides on, for example, a personal computer, and analyzes or sniffs information within a device as well as information communicated to or from the device. It should also be appreciated that the information management system 1 could be embedded in, for example, the BIOS of a personal computer or portable storage device, or could be a dedicated, stand-alone appliance operating on, for example, a corporate network such as a LAN or WAN.

An optional user interface module 150 can be provided that allows, for example, one or more of administration of the SID(s) and user manipulation of an assigned sensitive information identifier. For example, and based on certain administrative type rights, a user interface can selectively be displayed to a user that one or more of: confirms that a sensitive information identifier should be assigned to the identified sensitive information, allows the change in the ranking of the sensitive information identifier, allows a user to manually add a sensitive information identifier to information, allows the deletion of a sensitive information identifier from information, allows the changing of the Chron Job options, and the management of an associated sensitive information action (if present).

In addition to the intelligent analysis module 130 having the capability of sniffing, for example, network traffic in a corporate LAN or WAN environment, the intelligent analysis module 130 can also monitor more granular actions within, for example, a personal computer environment to assist with determining whether sensitive information is being extracted from, for example, a first document and transferred to a second, or derivative document or work.

For example, in an email environment, if a user forwards an email identified as sensitive, the intelligent analysis module 130 can be used to append a new sensitive information identifier to the forwarded email, or copy all or a portion of the existing sensitive information identifier from the originating email to the forwarded email.

In a similar manner, if a field, such as the "SSN field" within a database is copied into a text document, using, for example, the cut and paste keystrokes, the intelligent analysis module 130 can monitor the cut and paste activity and also associate a sensitive information identifier 180 with the text document. The extent of the sniffing of the intelligent analysis module 130 can be governed by the SID profile management module 160 and completely customized based on, for example, a user's requirements and/or specifications.

Once the information is identified as sensitive, as discussed above, the sensitive information identifier is associated with that information. As discussed, actions can be associated with the sensitive information such as deleting of the sensitive information, restricting access to the sensitive information, or the like. These various actions can be identified by the sensitive information identifier and the actions performed in conjunction with the sensitive information identifier action module 170. For example, if an expiration time is associated with the sensitive information, the sensitive information identifier action module 170 can detect that the expiration time limit has been triggered and, in conjunction with the information purging module 140, can delete or delete and sanitize the sensitive information. For sanitization, not only is the sensitive information deleted, but such items such as copies of the sensitive information in the recycle bin are deleted, the file allocation table is overwritten, and the physical space where the sensitive information was stored is overwritten. In general, sanitization allows all traces of the sensitive information to be eliminated. Also, optionally, a report can be provided to, for example, a system administrator that identifies back-up tapes that require sanitization.

An option can also be provided such that before purging of the sensitive information, a query can be generated that confirms the deletion of the sensitive information. For example, user interface module 150 can provide a user interface to the user confirming that the delete action is appropriate. Upon the confirmation of an authorized bypass, the user interface module 150 can, for example, provide the user with an interface that allows for manipulation of the sensitive information identifier that allows, for example, the editing of any particular information associated with the sensitive information identifier to include, for example, the expiration time of the sensitive information.

The signature module 110 and tamper module 120 further allow for the management of sensitive information by one or more of restricting access to the sensitive information or deleting the sensitive information upon, for example, detection of a certain activity.

More specifically, the signature module 110 can be activated upon a request to access sensitive information. The signature module 110 can analyze the sensitive information identifier and determine, for example, whether environmental constraints within the sensitive information identifier are satisfied. For example, the sensitive information identifier can specify that the sensitive information can only be opened on, for example, a PC with a particular hardware signature. Other examples of signatures include file size, user name, MAC addresses, or in general any information that can be used to restrict access to the sensitive information to a particular environment.

If a request to access the sensitive information is detected, the signature module 110 determines whether the environment from the access request matches the signature stored in the sensitive information identifier. If the signature matches, access is allowed. However, if the signature does not match, access is restricted, as will be discussed hereinafter, unless, as discussed above, a bypass is detected.

In addition to having the capability of restricting access to sensitive information, the information management system 1 can also, in conjunction with the tamper module 120, delete sensitive information upon the detection of a specific activity(s). For example, the detection of numerous invalid password attempts, the relocating of a laptop outside an authorized use environment, the detection of attempts to forward information to an unauthorized user, or the like, can trigger one or more of deletion and sanitization of sensitive information. As above, a bypass is available that allows the overriding of the deletion or sanitization upon, for example, the entry of an appropriate administrator-type password. If a bypass is not detected, the sensitive information can be automatically deleted or sanitized.

More specifically, if a delete sensitive information request is received by the information purging module 140, the information purging module 140 locates the sensitive information. If there are derivative works associated with the sensitive information, and based on the sensitive information identifier and the sensitive identifier action module 170, one or more of the sensitive information and associated derivative works are deleted. If the sensitive information identifier action module 170 further specifies that the sensitive information and/or derivative works should be sanitized, then the information is sanitized as appropriate.

If one or more of the signature module 110 and tamper module 120 determine that access should be restricted to specific sensitive information, the two modules can cooperate to one or more of prevent boot of a device, blank the screen of the device, disable the keyboard or other input or communication device, halt an application, obfuscate sensitive information (for example by placing asterisks over the sensitive information), restrict distribution of the sensitive information, prevent access to the device that contains the sensitive information, request supplemental authentication for access to the sensitive information, alter the boot sequence of a device that contains the sensitive information, modify the operating system and/or profile of the device comprising the sensitive information and/or disable the device.

For example, assume a laptop has been stolen. Typically, a laptop in a corporate network environment upon booting, authenticates to the network. If the laptop is booted in a manner such that authentication cannot be completed, an exemplary embodiment allows the logon/boot process to be altered to protect the sensitive information. Specifically, in conjunction with a process started by the sensitive information identifier action module 170, and an indicator from one or more of the signature module 110 and tamper module 120 that a tamper has been detected, the sensitive information identifier action module 170 could cooperate with the information purging module 140 to commence sanitization of all sensitive information on the laptop. In addition to the sanitization, the system can also optionally hide from the user what action is actually being completed by, for example, providing dummy login screen(s), blanking the screen, etc.

As will be appreciated, and to increase robustness of the system, one or more portions of the information management system 1 can be included in the BIOS, boot sector, or the like, that is the point of entry for access to the physical media on which the sensitive information is stored.

As discussed above, if the tamper module 120 or signature module 110 determine that deletion or access restriction to sensitive information should be implemented, ranking information can also be taken into account to determine the type of deletion or access restriction that should be utilized. For example, for less sensitive information, it may be sufficient to lock the keyboard and blank the screen of a laptop computer. For extremely sensitive information on the other hand, the boot sequence could be altered and sanitization of the sensitive information commenced in conjunction with blanking of the screen such that the user that attempted the unauthorized access is unaware of what is happening behind the scenes.

Tables I-IV illustrate various exemplary sensitive information identifiers highlighting the non-limiting types of information that can be associated with the SID.

TABLE I

| SID | |
| --- | --- |
| Information: | C:/documents/Sensitive.txt |
| Time to Expire: | 12/31/2008 |
| Exceptions: | None |
| Derivative Information: | None |
| Action: | Delete |

Table I illustrates an exemplary SID associated with the document Sensitive.txt. The SID specifies that the document Sensitive.txt will expire on Dec. 31, 2008 and no exceptions are allowed. The time to expire need not be limited to a fixed date. Optionally, the time to expire could be based on a template, such as for Sarbanes-Oxley compliance. For example, instead of an expiration time, a time to retain the information could be specified. Furthermore, the sensitive information does not need to be limited to information that is sensitive, but, in general, the systems, methods and techniques of this invention can be used to associate a SID with any type of information and the actions, etc, within the SID can be configurable in any manner.

TABLE II

| SID | |
| --- | --- |
| Information: | C:/email/messageID:35489MMRS |
| Ranking: | 4 |
| Time to Expire: | 3 Months |
| Action: | Delete All |
| Exceptions: | Bypass Allowed |
| Derivative Information: | Forwarded Email messageID: 35489MMRSfwd Reply Email messageID:35489MMRSrpl |

Table II illustrates an exemplary SID associated with an email. The SID specifies that the email will expire in three months and that a bypass is allowed. The action indicates that the email and all derivative works are to be deleted. For this example, since the email was ranked as a 4, no sanitization was necessary.

TABLE III

| SID | |
| --- | --- |
| Information: | C:/Secrets.txt |
| SID Location: | /hidden/SIDs/Secrets.txt.SID |
| Ranking: | 1 |
| Time to Expire: | 1 Week |
| Exceptions: | Bypass Allowed-Admin Privileges Only |
| Derivative Information: | Cut and Paste to New Document: //user/Mr. X/IgnoreThis.txt New Email with IgnoreThis.txt as attachment messageID: 365732.410874 |
| Accelerate: | If Attempt to move information out of XYZ Company network Then Immediately Sanitize, Log and Report to Security |
| Action: | Sanitize All |
| Log: | Opened By: ... Edited By: ... Copied By: ... Viewed By: |

Table III illustrates an exemplary SID associated with a document Secrets.txt. The SID specifies that the document will expire in one week, based on a ranking of 1, and that a bypass is allowed by a certain category of users. The storage location of the SID is also shown in this exemplary SID, and can optionally be hidden. Derivative information is also shown with a conditional accelerate action provided based on certain criteria. Based on the ranking of 1, the action triggered by the time to expire is sanitization of the document as well as all derivative works. Log information is also kept for this document and tracks, as an example, who opens the document, who edits the document, who copies the document and who has viewed the document.

TABLE IV

| SID | |
| --- | --- |
| Information: | /emailserver/emailstorage/messageID:163325.215 |
| Ranking: | 1 |
| Time to Expire: | Conditional |
| Action: | Sanitize All if accelerate condition met |
| Limitations: | Do not allow copying to other formats Use notify GUI if attempted |
| Exceptions: | Bypass Allowed-Admin Privileges Only |
| Derivative Information: | Forwarded to X with messageID:163325.215fwd Forwarded to Y with messageID:163325.215fwd2 Forwarded to Z with messageID:163325.215fwd3 Reply to all with messageID:163325.215rplyall |
| Accelerate: | If Attempt to move information out of XYZ Company network Then Immediately Sanitize, Log and Report to Security Or If Requested by Admin Then Locate and sanitize all Or If tamper attempt Then Locate and sanitize all ... |
| Action: | Sanitize All |
| Log: | Opened By: ... Edited By: ... Copied By: ... Viewed By: |

Table IV illustrates another exemplary SID. This SID is for an email with a ranking of 1 and a conditional time to expire. Upon the condition being satisfied, all emails associated with the original email are sanitized. This SID further specifies that copying (such as a cut and past or "save as") are prohibited for this email and a pop-up is displayed to the user reminding them of this limitation. As with the above examples, derivative information is tracked, a conditional accelerate condition is provided and a log is maintained.

Figure 2:
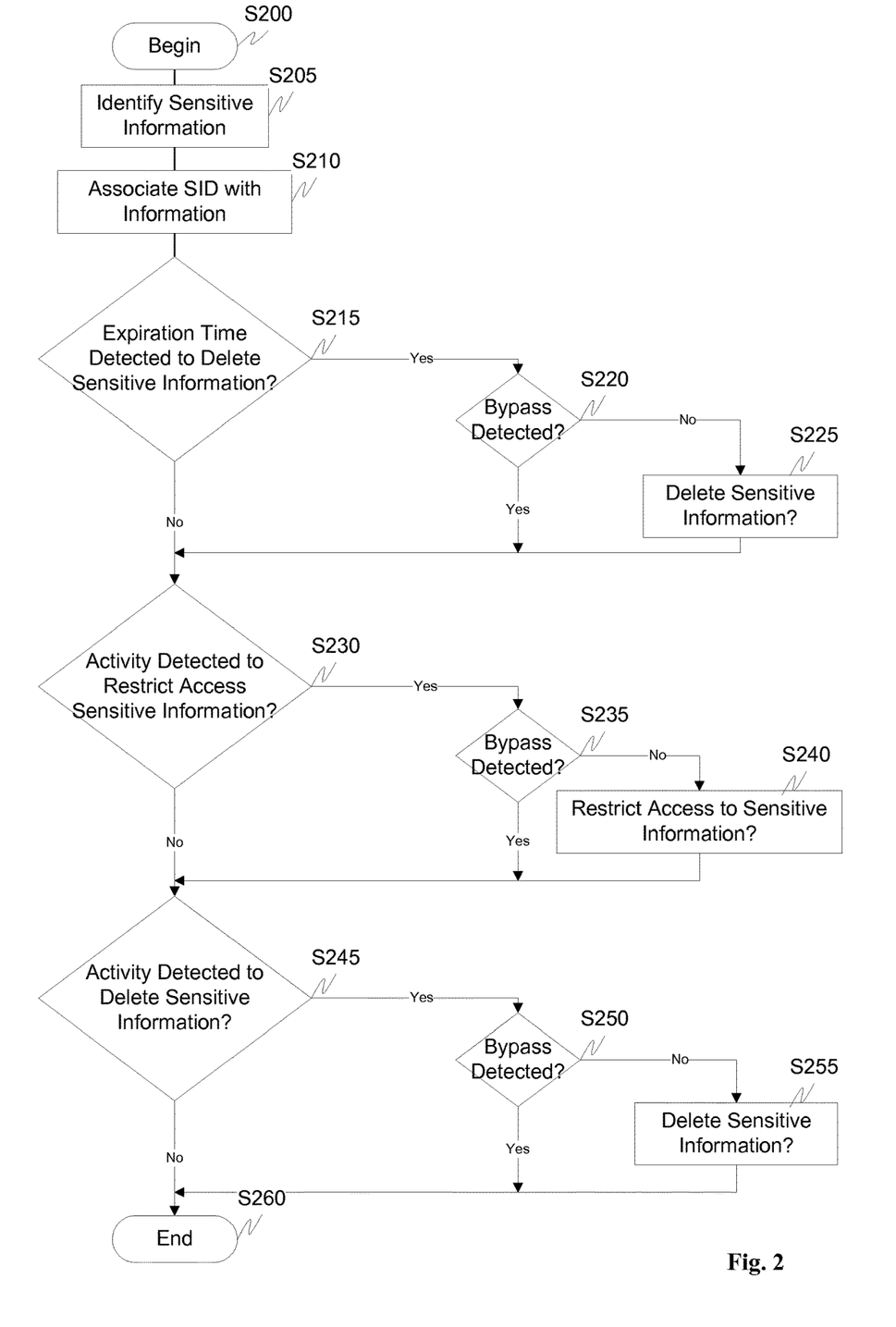
FIG. 2 is a flowchart outlining an exemplary method for managing sensitive information.

FIG. 2 outlines an exemplary method for managing sensitive information. In particular, control begins in step S200 and continues to step S205. In step S205, sensitive information is identified. For example, as discussed above, the identification of sensitive information can be based on a profile or template. Alternatively, or in addition, upon creation of sensitive information, a user interface can be provided that allows a sensitive information identifier to be created and associated with the sensitive information. (Step S210) Next, in step S215, a determination is made whether an expiration time has been detected. If an expiration time has been detected that specifies the deletion of sensitive information control continues to step S220. Otherwise, control jumps to step S230.

In step S220 a determination is made whether a bypass (or override sequence) has been entered. If a bypass has been entered, control jumps to step S230. Otherwise, control continues to step S225 where the sensitive information is one or more of deleted and sanitized. Control then continues to step S230.

In step S230, a determination is made whether one or more activities have been detected that justify restriction of access to sensitive information. If such an activity has been detected, control continues to step S235, with control otherwise jumping to step S245.

In step S235, a determination is made whether a bypass has been entered. If a bypass is entered, control continues to step S245. Otherwise, control continues to step S240 where access to the sensitive information is restricted. Control then continues to S245.

In step S245, a determination is made whether activity has been detected that justifies the deletion of sensitive information. If a triggering activity has been detected, control continues to step S250 with control otherwise jumping to step S260.

In step S250, a determination is made whether a bypass has been entered. If a bypass is entered, control continues to step S260 where the control sequence ends.

Otherwise, in lieu of a bypass event, control continues to step S255 where the sensitive information is one or more of deleted and sanitized with control continuing to step S260 where the control sequence ends.

Figure 3:
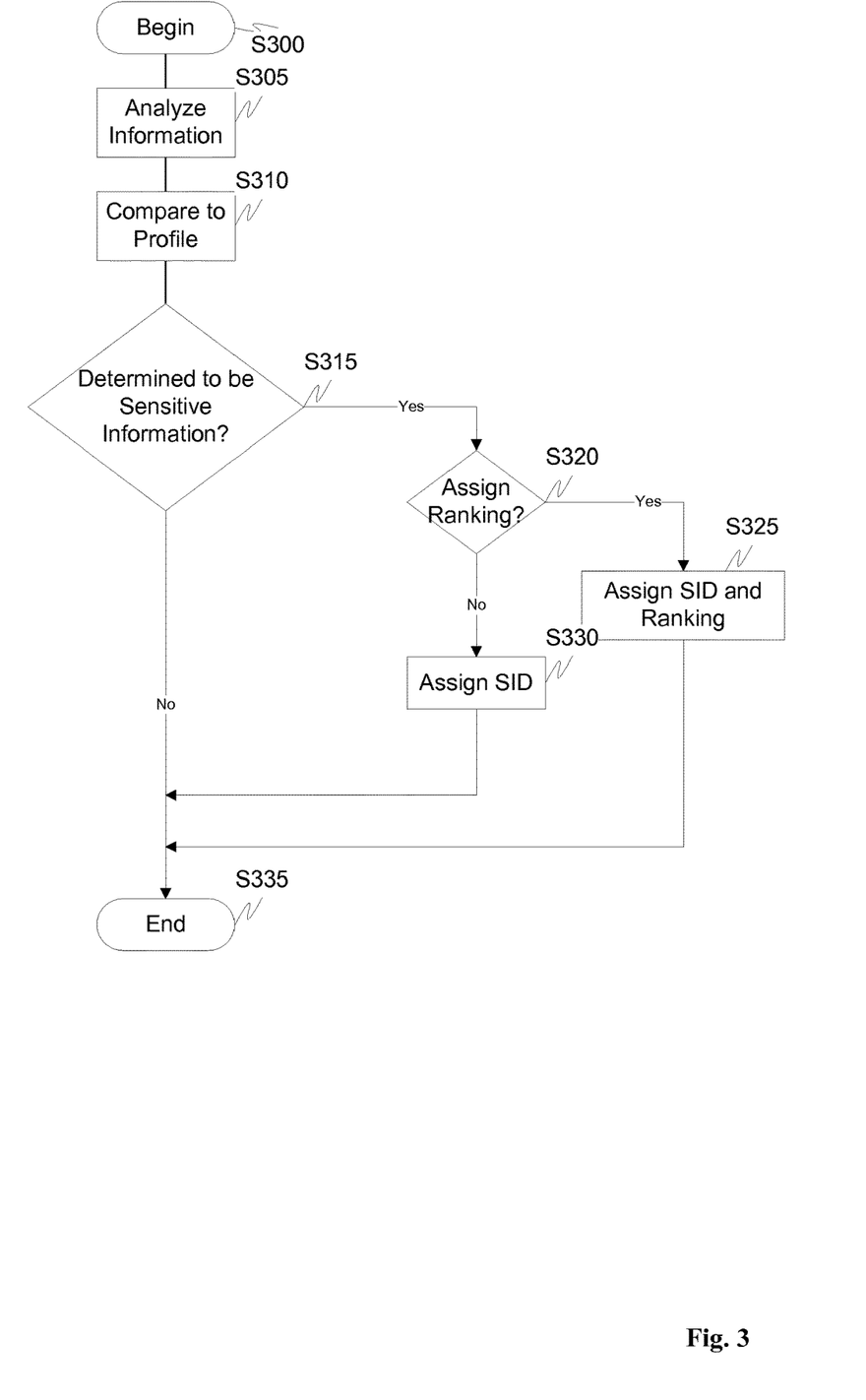
FIG. 3 is a flowchart outlining an exemplary method for identifying and assigning a ranking to sensitive information.

FIG. 3 outlines in greater detail, the identify sensitive information step S205 of FIG. 2. In particular, control begins at step S300 and continues to step S305. In step S305, information is analyzed or sniffed and compared in step S310 to one or more profiles. If the information or portions thereof, correspond to profiles or templates that have been identified as sensitive information, in step S315, control continues to step S320. Otherwise, if the information is not identified as being sensitive, control jumps to step S335 where the control sequence ends.

In step S320, a ranking can optionally be assigned to the sensitive information. If a ranking is assigned, control continues to step S325 where a ranking is assigned and associated with the SID. Otherwise, control continues to step S330 where a SID is assigned to the sensitive information with control continuing to step S335 where the control sequence ends.

Figure 4:
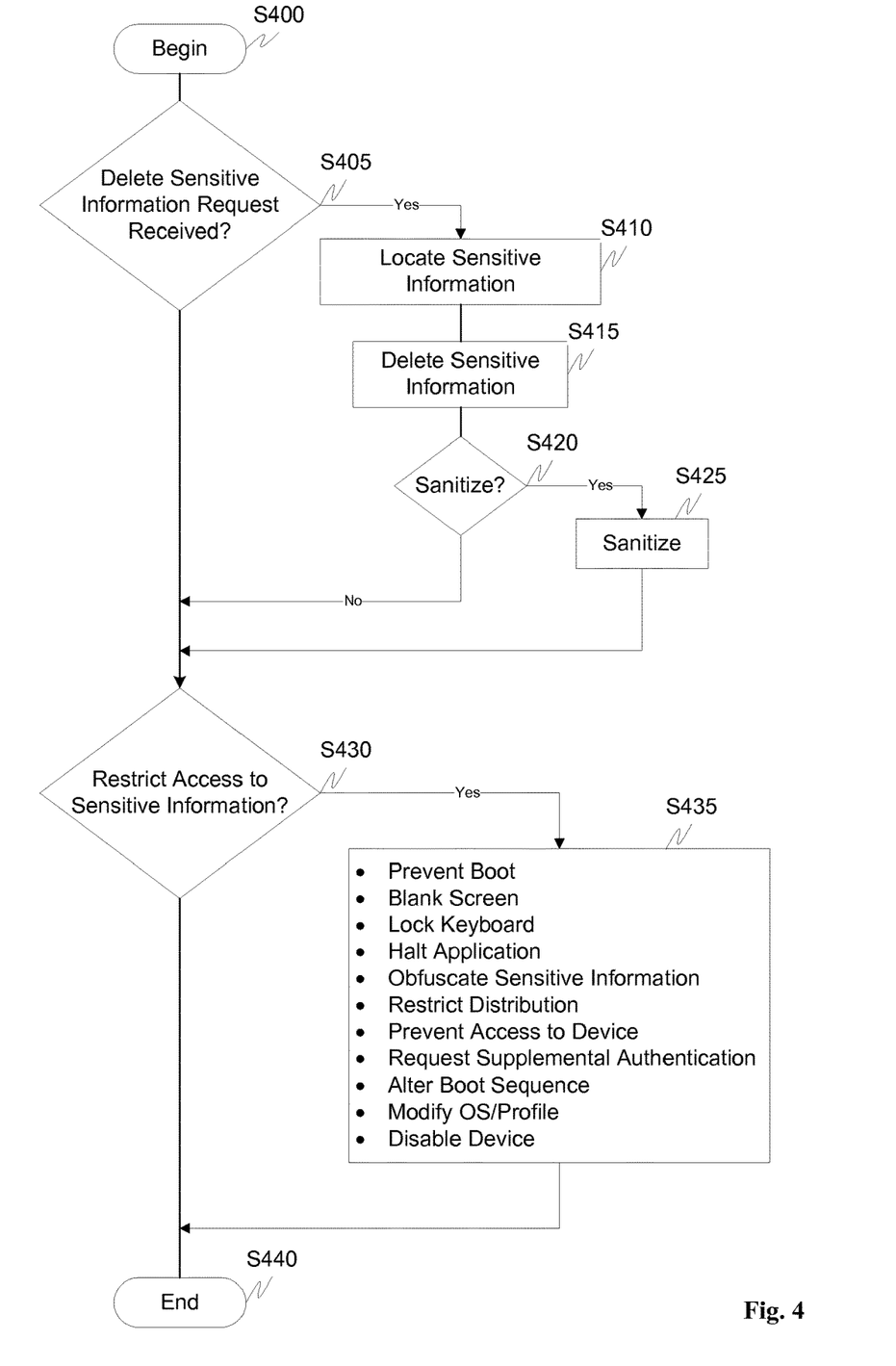
FIG. 4 is a flowchart outlining an exemplary method for deleting or restricting access to sensitive information.

FIG. 4 outlines in greater detail the deletion of sensitive information or restricting of access to sensitive information steps of FIG. 2. In particular, control begins in step S400 and continues to step S405. In step S305, a determination is made whether a request to delete sensitive information has been received. If a request to delete sensitive information has been received, control continues to step S410. Otherwise, control jumps to step S430.

In step S410, the sensitive information is located. Optionally, any derivative work(s) can also be located. Next, in step S415, the sensitive information is deleted. Optionally, any derivative work(s) can also be deleted. Then, in step S420, a determination is made, for example, based on a ranking associated with the sensitive information, whether the sensitive information (and optionally derivative work(s)) should be sanitized. If the sensitive information should be sanitized, control continues to step S425 where the sensitive information is sanitized with control otherwise jumping to step S430.

In step S430, a determination is made whether a request to restrict access to the sensitive information has been received. If a request to restrict access to the sensitive information has been received, control continues to step S435. Otherwise, control jumps to step S440 where the control sequence ends.

In step S435, one or more of the following actions could be utilized to restrict access to the sensitive information. The type of action chosen can be based on, for example, the ranking associated with the sensitive information and the access restriction can be combined with the deletion and/or sanitization steps discussed above. For example, the access restriction can prevent boot of a device, blank the screen, lock the keyboard or other input device, halt an application(s), obfuscate sensitive information on a display device, restrict distribution, such as email forwarding, copying, or cutting and pasting of the sensitive information, prevent access to the device, such as a hard drive, smart card, USB storage device, database, or the like, request supplemental authentication for access to the sensitive information, alter a boot sequence, modify an operating system or profile or disable the device. Other options are available to restrict access to sensitive information and can be based on, for example, the environment in which the sensitive information is located.

In addition to the monitoring of the exchange of information between, for example, various entities, and the information management system tracking the movement of sensitive information, actions initiated by a user can also be monitored to assist with the restriction of distribution of sensitive information and/or access to the sensitive information. For example, if a user selects to "copy" sensitive information with the intention of "pasting" that sensitive information into another document, the intelligent analysis module 130, in cooperation with the sensitive information identifier action module 150 and SID profile management module 160 can one or more of prohibit the operation, prohibit the operation and notify the user that the operation is not possible based on a sensitivity identifier, block the attempt to copy the sensitive information, delete the sensitive information or in general, perform any action based on information within the sensitive information identifier. The system can also optionally log the attempt to copy the sensitive information. Furthermore, if a bypass is entered, and the blocking overridden, the system can optionally maintain a database of the derivative work into which the sensitive information was copied.

As another example, a laptop could be configured such that it only operates within a specific geographical region. This geographic area could be modified by travel events that are shown in any scheduler or calendar application. For example, if the laptop is GPS enabled, the sensitive information identifier could contain information that specifies the sensitive information could only be accessed within, for example, the particular geographic region, such as a metropolitan area or within proximity of where the user has travelled to in the case of cross-correlation with a scheduler or calendar application. Should the laptop leave that metropolitan area, the intelligent analysis module 130 can cooperate with the SID profile management module 160 and GPS module and determine, for example, when the laptop leaves that geographically restricted area, whether access to the information should be restricted and/or the information should be deleted or sanitized.

As another example, the sensitive information identifier could be used by devices receiving the sensitive information to restrict how the sensitive information is handled on the receiving device. For example, a memory device, such as a flash drive, could include a restrictor specifying that sensitive information with a ranking above a certain threshold could not be stored on that device. Therefore, for example, when a user tries to store sensitive information with a ranking above that threshold on the device, an error is generated, the action is not completed, a log is generated, or the like.

As an example of an extension of the expiration time associated with a sensitive information identifier, assume, for example, the expiration time is set to one year. However, due to holidays at the end of the year, and travel scheduled by the user, this expiration time is extended by 17 days into the following year. At the end of the 17 day extension, the user is queried to confirm whether the sensitive information should be deleted.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as telecom test device, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present invention, systems and methods for information management. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method of managing information comprising:
associating, by a processor, a sensitive information identifier with information identified as sensitive, wherein the sensitive information identifier is associated with an email received by a user:
tracking actions, by the processor, relative to the information identified as sensitive, wherein tracking the actions comprises appending a new sensitive information identifier to an email forwarded by the user that was forwarded based on the email received by the user;
performing, by the processor in response to tracking the actions, an action to protect the information identified as sensitive from unauthorized access based on the sensitive information identifier, wherein the action performed is to delete or sanitize the email and the email forwarded by the user; and
detecting, by the processor, a tamper attempt and performing, by the processor, an accelerated action based on the sensitive information identifier.

2. An information management system comprising:
a processor and a computer memory coupled thereto, said computer memory comprising instructions in a form of modules which are executed by the processor, the modules comprising;
an intelligent analysis module which causes the processor to associate a sensitive information identifier with information identified as sensitive and to track actions relative to the information identified as sensitive, wherein the sensitive information identifier is associated with an email received by a user and wherein tracking the actions comprises appending a new sensitive information identifier to an email forwarded by the user that was forwarded based on the email received by the user;
a sensitive information identifier action module which causes the processor to perform an action to protect the information identified as sensitive from unauthorized access based on the sensitive information identifier, wherein the action preformed is to delete or sanitize the email and the email forwarded by the user; and
a tamper module that causes the processor to detect a tamper attempt and operate in conjunction with the sensitive information identifier action module to perform the action based on the sensitive information identifier, and a signature module that causes the processor to cooperate with the tamper module so the processor can determine that access should be restricted to specific sensitive information, the tamper, sensitive information identifier action, and signature modules causing the processor to perform one or more of preventing boot of a device, blanking a screen of the device, disabling a keyboard of the device, disabling an input for the device, halting an application, obfuscating the information identified as sensitive, restricting distribution of the information identified as sensitive, preventing access to the device that contains the information identified as sensitive, requesting supplemental authentication for access to the information identified as sensitive, altering a boot sequence of the device that contains the information identified as sensitive, modifying an operating system and/or profile of the device comprising the information identified as sensitive or disabling the device.

3. A method of managing information comprising: associating, by a processor, a sensitive information identifier with information identified as sensitive, wherein the sensitive information identifier is associated with an email received by a user;
  tracking actions, by the processor, relative to the information identified as sensitive, wherein tracking the actions comprises appending a new sensitive information identifier to an email forwarded by the user that was forwarded based on the email received by the user; and
  performing, by the processor in response to tracking the actions, an action to protect the information identified as sensitive from unauthorized access based on the sensitive information identifier, wherein the action performed is to delete or sanitize the email and the email forwarded by the user;
  wherein the action is to sanitize the information identified as sensitive and further comprises altering, by the processor, a login or boot process by hiding the sanitization of the information identified as sensitive by providing a dummy login screen or blanking the screen while the information identified as sensitive is sanitized.

4. The method of claim 3, wherein the action is performed to sanitize the information identified as sensitive comprises altering the login or boot process by hiding the sanitization of the information identified as sensitive by providing a dummy login screen.

5. A method of managing information comprising:
  associating, by a processor, a sensitive information identifier with information identified as sensitive, wherein the sensitive information identifier is associated with an email received b a user;
  tracking actions, by the processor, relative to the information identified as sensitive, wherein tracking the actions comprises appending a new sensitive information identifier to an email forwarded by the user that was forwarded based on the email received by the user; and
  preforming, by the processor in response to tracking the actions, an action to protect the information identified as sensitive from unauthorized access based on the sensitive information identifier, wherein the action performed is to delete or sanitize the email and the email forwarded by the user;
  wherein the sensitive information identifier further comprises information about a geographical region, wherein the information about the geographical region allows the information identified as sensitive to be accessed only when a communication device of the user that contains the information identified as sensitive is operating within the geographical region, and wherein the geographical region is based on a calendar application of the user.

* * * * *

UNITED STATES PATENT AND TRADEMARK OFFICE
CERTIFICATE OF CORRECTION

PATENT NO.         : 11,270,267 B2
APPLICATION NO.    : 11/955170
DATED              : March 8, 2022
INVENTOR(S)        : David S. Mohler and Jason H. Vick Page 1 of 1

It is certified that error appears in the above-identified patent and that said Letters Patent is hereby corrected as shown below:

In the Claims

At Column 14, Line 64, please delete "preformed" and insert --performed-- therein.

At Column 15, Line 24, please delete "preforming" and insert --performing-- therein.

At Column 16, Line 17, please delete "b" and insert --by-- therein.

Signed and Sealed this
Twenty-eighth Day of June, 2022

Katherine Kelly Vidal
*Director of the United States Patent and Trademark Office*